US012374875B2

(12) United States Patent
Olsson et al.

(10) Patent No.: US 12,374,875 B2
(45) Date of Patent: Jul. 29, 2025

(54) INSPECTION SYSTEM PUSH-CABLE GUIDE APPARATUS (71) Applicant: SeeScan, Inc., San Diego, CA (US)

(72) Inventors: Mark S. Olsson, La Jolla, CA (US); David C. Parsons, San Marcos, CA (US); Andrew P. Corvin, San Diego, CA (US); Alexander L. Warren, Escondido, CA (US)

(73) Assignee: SeeScan, Inc., San Diego, CA (US)

( * ) Notice: Subject to any disclaimer, the term of this patent is extended or adjusted under 35 U.S.C. 154(b) by 1025 days.

(21) Appl. No.: 17/397,940

(22) Filed: Aug. 9, 2021

(65) Prior Publication Data

US 2022/0085592 A1 Mar. 17, 2022

Related U.S. Application Data (60) Provisional application No. 63/063,151, filed on Aug. 7, 2020.

(51) Int. Cl.
*H02G 11/02* (2006.01)
*H02G 1/08* (2006.01)

(52) U.S. Cl.
CPC ............... *H02G 11/02* (2013.01); *H02G 1/08* (2013.01)

(58) Field of Classification Search
CPC ................................ H02G 1/08; H02G 11/02
See application file for complete search history.

(56) References Cited

FOREIGN PATENT DOCUMENTS

| CN | 106629274 A | * | 5/2017 | ......... B65H 54/2818 |
| EP | 2857339 | | 4/2015 | |
| EP | 3038965 | | 7/2016 | |
| EP | 3038965 A1 | * | 7/2016 | ........... B65H 75/364 |

OTHER PUBLICATIONS

International Searching Authority, "Written Opinion of the International Searching Authority" for PCT Patent Application No. PCT/US2021/054060, Dec. 17, 2021, European Patent Office, Munich.

* cited by examiner

Primary Examiner — Robert J McCarry, Jr.
(74) Attorney, Agent, or Firm — Steven C. Tietsworth, Esq.; Michael J. Pennington, Esq.

(57) ABSTRACT

Cable storage drum-reel and cable guide apparatus, methods, and systems are provided for deploying and retracting at least one push-cable with a distally mounted camera into and out of a pipe or cavity for applications such as plumbing and underground utility location. In an exemplary embodiment, a cable guide assembly may include a bracket, and one or more wear guides positioned with openings in the bracket. The one or more wear guides may include two spaced-apart wear guides each having an opening defining an inner diameter. In one embodiment, the spacing between the two wear guides may be a distance of three or more times the inner diameter of the wear guides.

20 Claims, 13 Drawing Sheets

INSPECTION SYSTEM PUSH-CABLE GUIDE APPARATUS

CROSS-REFERENCE TO RELATED APPLICATIONS

This application claims priority under 35 U.S.C. § 119(e) to U.S. Provisional Patent Application Ser. No. 63/063,151, entitled INSPECTION SYSTEM PUSH CABLE GUIDE APPARATUS, filed Aug. 7, 2020, the content of which is hereby incorporated by reference herein in its entirety for all purposes.

FIELD

This disclosure relates generally to cable guides used in video inspection systems. More specifically, but not exclusively, this disclosure relates to cable storage drum-reel and cable guide apparatus, methods, and systems for deploying and retracting at least one camera and additional cables and/or hoses into and out of a pipe or cavity for applications such as plumbing and underground utility location.

BACKGROUND

Figure 1A:
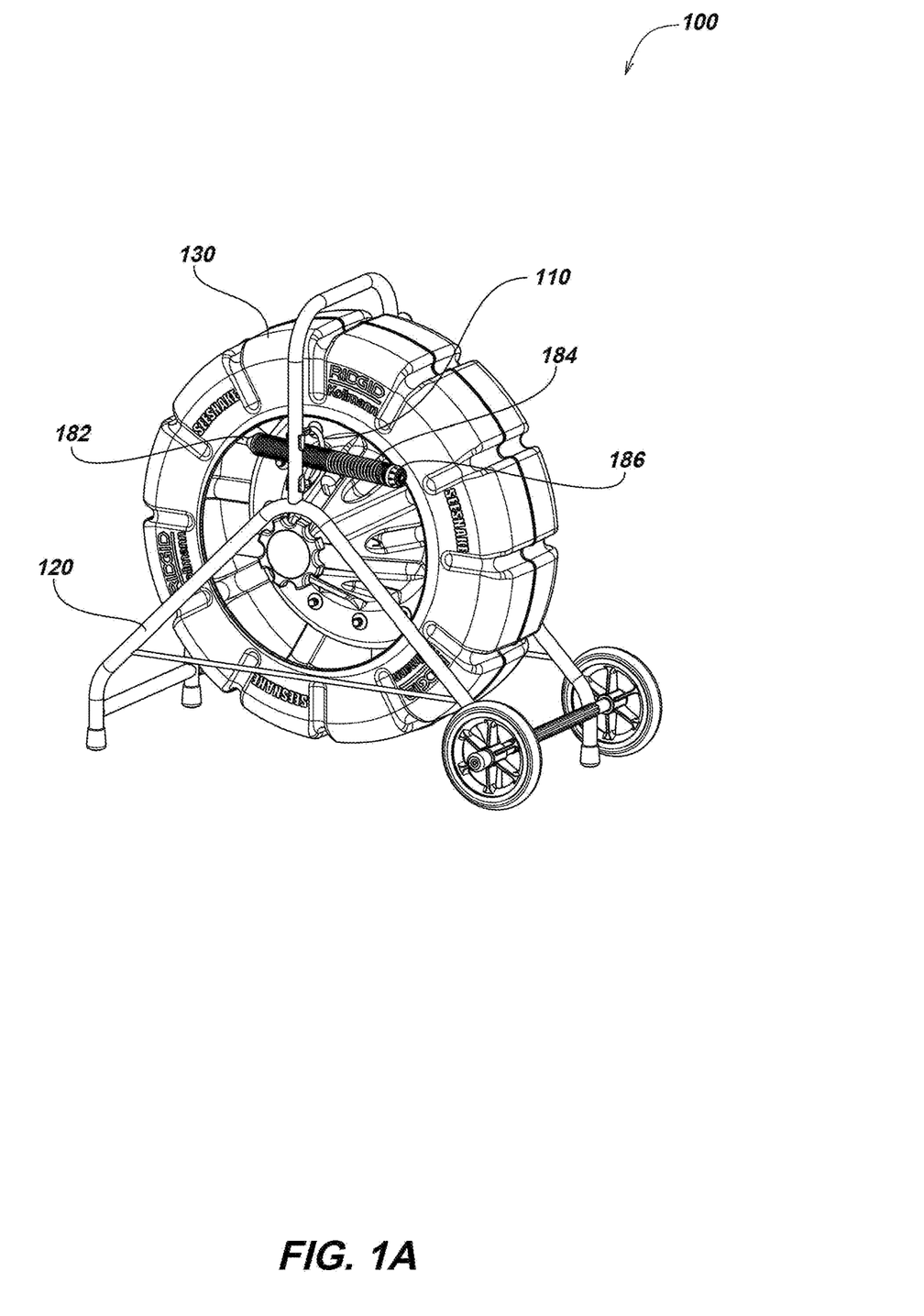
FIG. 1A illustrates a prior art video inspection system with a round wire-type cable guide.
Figure 1B:
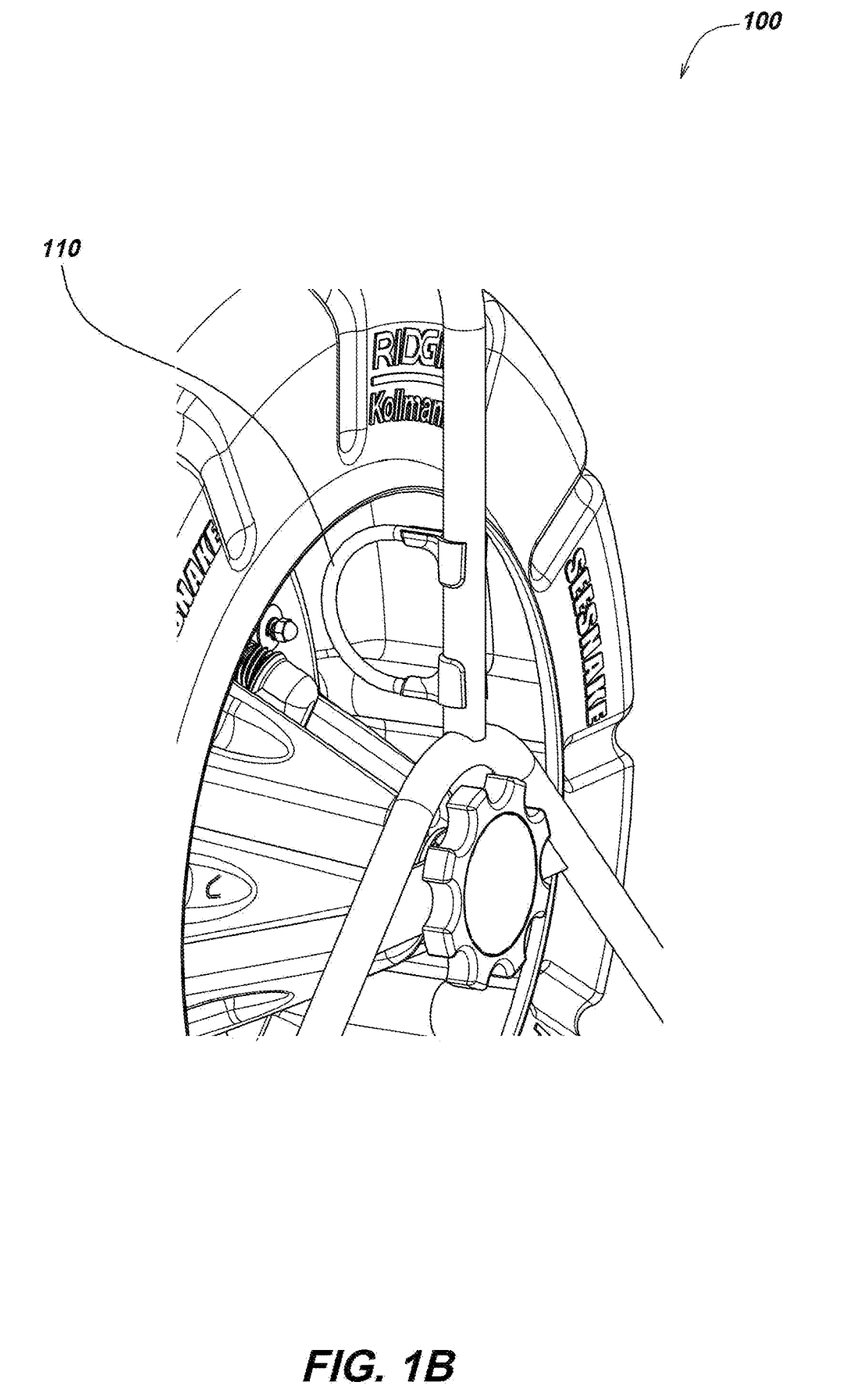
FIG. 1B illustrates details of the cable guide from the prior art video inspection system of FIG. 1A.

Cable guides used in prior art video inspection systems such as shown in FIG. 1A have typically been simple structures such as cable guide 110 shown in further detail in FIG. 1B. Specifically, cable guide 110 is simply a half-circular loop of round cross sectional steel, similar in shape to a U-bolt. While these cable guides work better than nothing at all in aiding deployment and retraction of a push-cable from a drum or reel, novel and non-obvious improved cable guide apparatus as described subsequently herein may be used to provide better cable deployment and retraction performance by improving push-cable feed consistency and reducing friction, as well as providing other potential advantages.

SUMMARY

This disclosure relates generally to cable guides used in video inspection systems. More specifically, but not exclusively, this disclosure relates to cable storage drum-reel and cable guide apparatus, methods, and systems for deploying and retracting at least one camera and additional cables and/or hoses into and out of a pipe or cavity for applications such as plumbing and underground utility location.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

FIG. 1A illustrates an example prior art video pipe inspection system 100 including a frame 120, a cable drum or reel 130 mounted to the frame 120, a push-cable 182 wound on the reel 130 (as shown, most of the push-cable 182 is wound into the reel 130 and in use would be deployed therefrom), a camera head 186 mounted to the distal end of the push cable 182 for capturing images or video from within a pipe or other cavity, and a protective spring 184 at the distal end of the push-cable 182 to ease deployment of the push-cable 182 around corners and protect the camera head body during use. A cable guide such as cable guide 110 is mounted on the frame 120, and the push-cable 182 is fed into or out of a pipe or other cavity through the cable guide 110 which aids in winding the push-cable 182 onto or off of the reel or drum 130.

For example, in operation, a user inserts the camera head 186 into a pipe or other cavity and then pushes it forward into the pipe by hand by pulling the push-cable 182 from the reel 130 and pushing the push-cable 182 into the pipe. Alternately in some applications, the push-cable 182 may be deployed or retracted via a powered feed mechanism (not shown in FIG. 1A). The push-cable 182 may be moved through various sections of a pipe or cavity while a video or still image is displayed on a monitor, cell phone, Of other device (not shown in FIG. 1A). When a video inspection is completed, the user then pulls the push-cable 182 back from within the pipe, with the push-cable 182 going through the cable guide 110 and then into the reel or drum 130.

Cable guides used in video inspection systems such as shown in FIG. 1A have typically been simple structures such as cable guide 110 shown in further detail in FIG. 1B. Specifically, cable guide 110 is simply a half-circular loop of round cross sectional steel, similar in shape to a U-bolt. While these cable guides work better than nothing at all in aiding deployment and retraction of a push-cable from a drum or reel, novel and non-obvious improved cable guide apparatus as described subsequently herein may be used to provide better cable deployment and retraction performance by improving push-cable feed consistency and reducing friction, as well as providing other potential advantages.

Figure 2A:
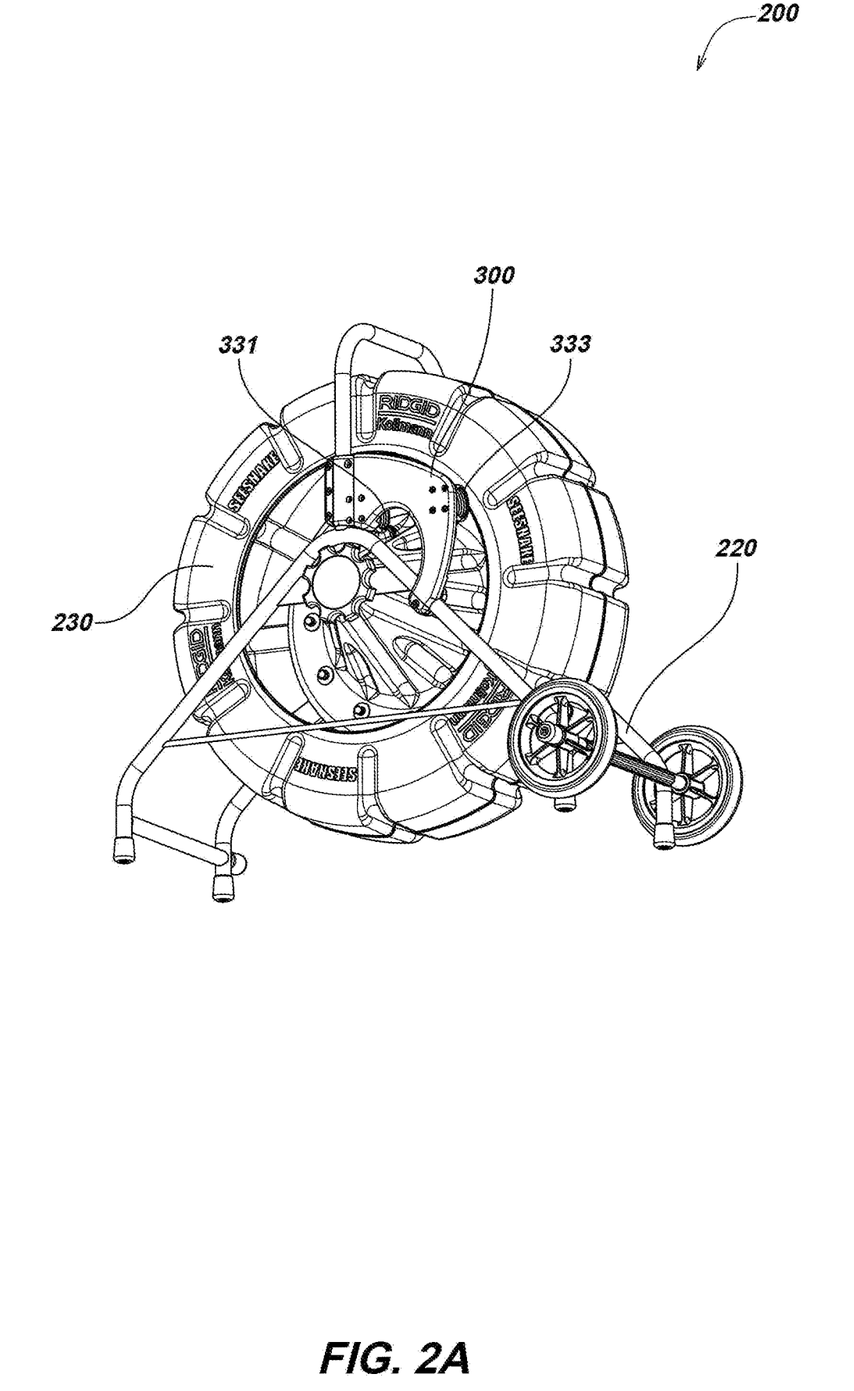
FIG. 2A illustrates details of one embodiment of a video inspection system in accordance with aspects of the disclosure.

FIG. 2A illustrates one embodiment of a video inspection system 200 with an enhanced cable guide assembly 300. System 200 includes a frame 220, a cable drum or reel 230, as well as a cable guide assembly 300 mounted to the frame 220 as shown. Feed guides (also denoted as "wear guides") 331 and 333 as shown in FIG. 2A are used as inserts with wear-resistant openings through which a push-cable or other wire or cable assembly is fed during retraction or deployment from a cable reel as described in further detail subsequently herein.

Figure 2B:
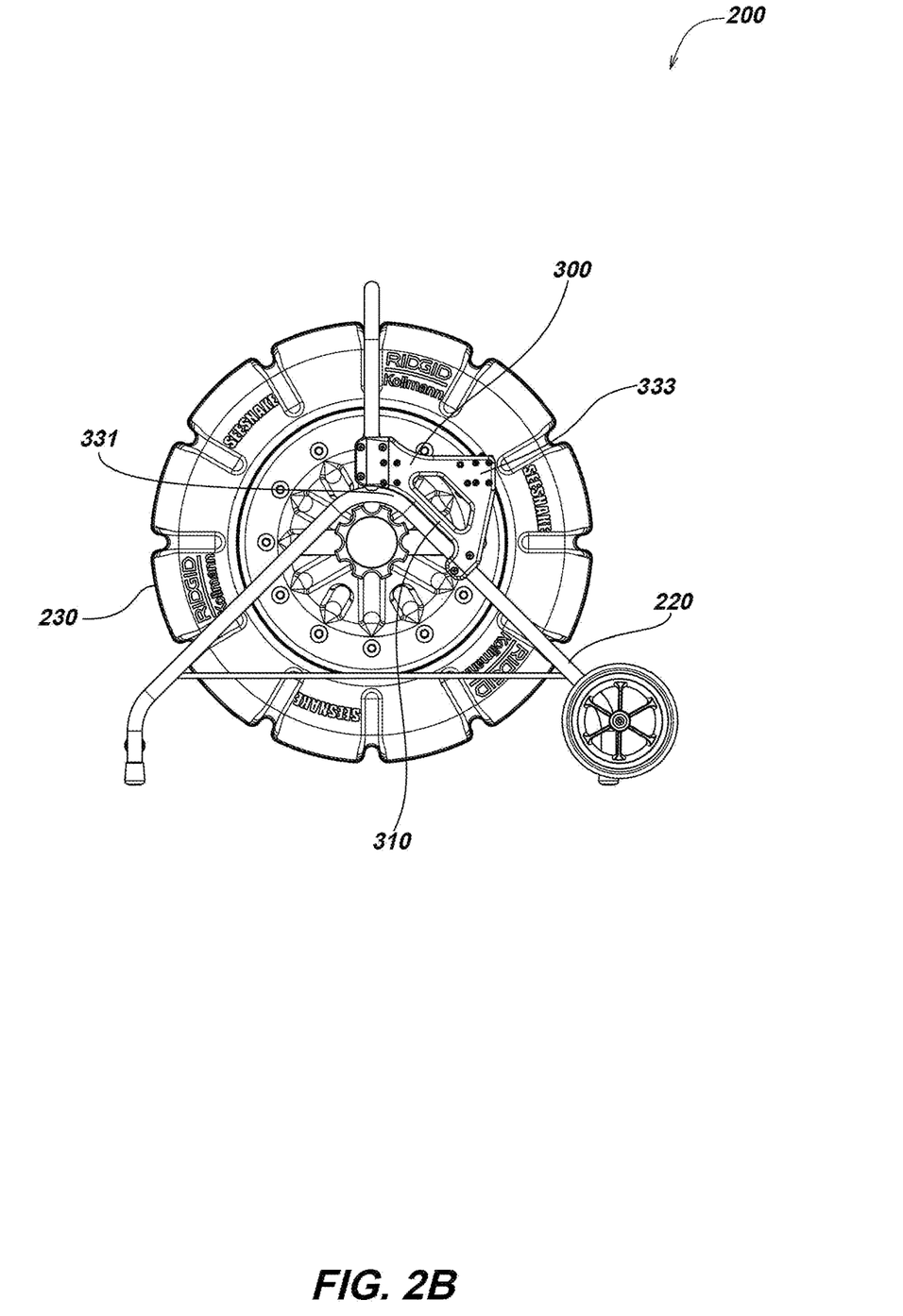
FIG. 2B illustrates additional details of the push-cable guide assembly embodiment shown in FIG. 2A.

FIG. 2B illustrates additional details of cable guide assembly 300 seen from a side view mounted to frame 220 as shown in FIG. 2A. As described in further detail subsequently herein, cable guide assembly 300 includes a bracket element (or elements) 310 and one or more feed guides 331, 333 mounted in the bracket element 310. In an exemplary embodiment as shown in FIG. 2B, the cable guide assembly 300 includes two feed guide elements (i.e., guides 331 and 333), although in alternate embodiments a single feed guide may be used, or, in other embodiments, three or more may be used depending on the application and distance through which the push-cable needs to be fed.

Figure 3A:
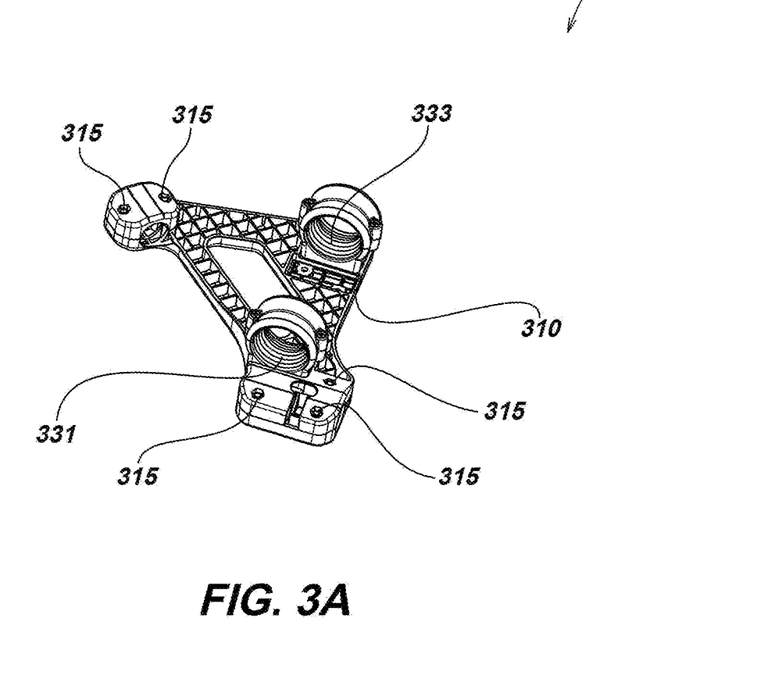
FIG. 3A illustrates details of a push-cable guide assembly embodiment inner side for use on a video inspection system such as shown in FIG. 2.
Figure 3B:
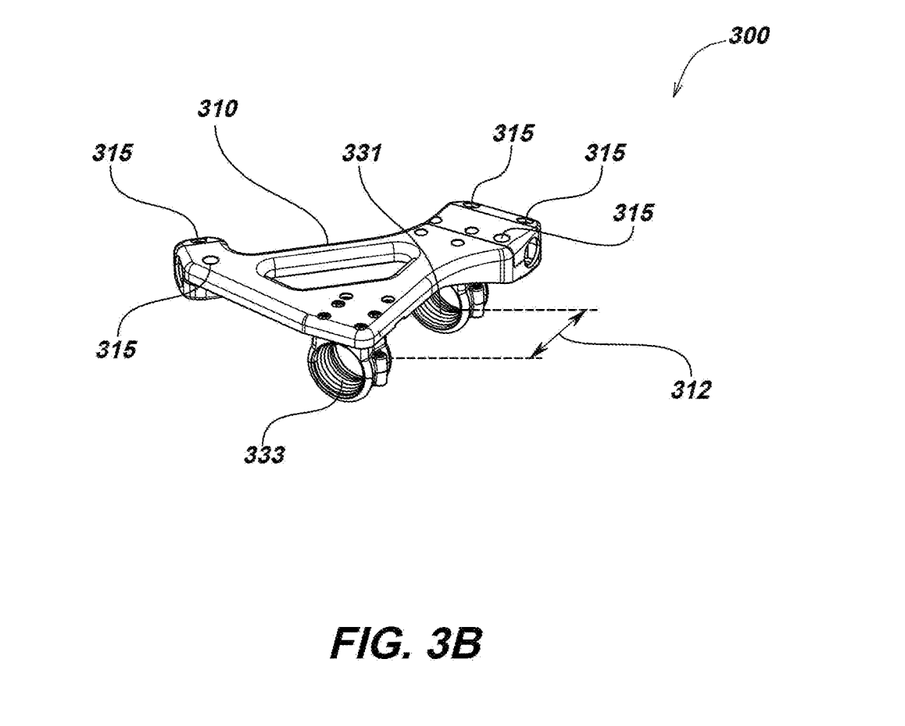
FIG. 3B illustrates details of the push-cable guide assembly embodiment shown in FIG. 3A seen from the outward-facing side.

FIGS. 3A and 3B illustrate additional details of the cable guide assembly embodiment 300 removed from the inspection system frame 220. Feed guides 331 and 333 are positioned in corresponding openings in the bracket 310, and the bracket includes mounting holes 315 for insertion of screws or bolts to attach the bracket to the frame 220. Feed guides 331 and 333 may be separated by a distance 312.

In this configuration, Cable guide assembly embodiment 300 is removably attachable, however, in other embodiments bracket 310 could be a metal part rigidly affixed to the frame as a weldment, or via some other attachment method well known in the art. In alternate embodiments, bracket element 310 could be shaped differently than shown in FIGS. 3A and 3B, and could be made of various materials or combinations of materials, such as plastic, metal, etc., and could be removably attachable or fixed to frame 220.

Figure 4A:
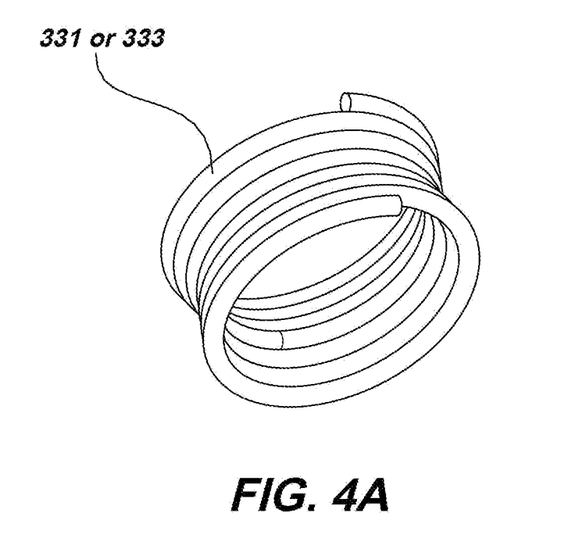
FIGS. 4A-4C illustrate details of an example feed guide element embodiment in accordance with aspects of the disclosure.
Figure 4B:
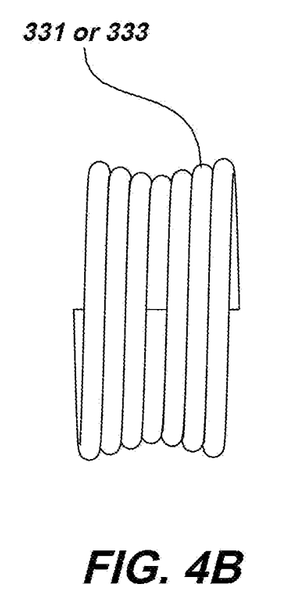
Figure 4C:
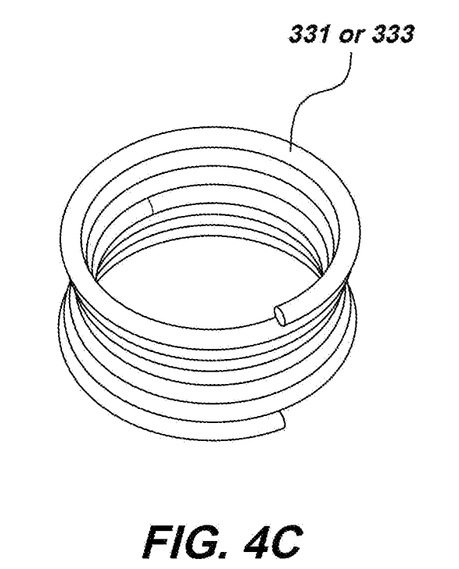

FIGS. 4A-4C illustrate additional details of example feed guides 331 or 333 (as shown in FIGS. 3A and 3B) in accordance with certain aspects. These elements may also be denoted herein as simply "feed guides" for brevity. In the embodiments shown herein the feed guides are of the same size, shape, and material, however, in other embodiments using two or more feed guides, they may alternately be of different sizes and/or shapes. For example, in some embodiments the outer feed guide (i.e., the wear guide at the end opposite to the cable reel/drum) may have a larger opening and/or different opening shape than inner feed guides (i.e., the wear guide closest to the cable reel/drum) to, for example, accommodate wider push-cable retraction angles upon retraction (e.g., once past the outer feed guide the push-cable may be more centrally positioned, thereby allowing for a smaller inner guide diameter).

In some embodiments, cable guides 331 and 333 need not be separated, but instead could be continuously connected. For instance, cable guides 331 and 333 could be opposite ends of a tube of various shapes.

FIG. 4A illustrates feed guide embodiment 331 or 333 in perspective showing the wire coiled to form an inward tapering shape with a minimum diameter central opening with the opening diameter expanding outward in both directions to form an hourglass shaped cross-sectional structure. FIG. 4B illustrates feed guide 331 or 333 in side view, and FIG. 4C illustrates feed guide 331 or 333 in top-down perspective view. Although feed guide 331 or 333 is an exemplary embodiment, other embodiments (not shown) may use wire coiled in other shapes such as a structure having maximum diameter at the entry side and minimal diameter at the exit side with tapering being either linear or curve-shaped. In other embodiments, the entry side and exit side diameters may vary. Alternately, the wear guide may, in some embodiments, be cast, forged, 3D printed, stamped, or manufactured with other techniques known or developed in the art and may use sheet metal or other materials besides round cross-sectional wire as shown.

In an exemplary embodiment, feed guides 331 and 333 may be of the same or similar structures as shown in feed guides 331 and 333, and may have a hyperbolic or hourglass shaped inner curve as shown to allow a push-cable to move smoothly through the guide during retraction or deployment and be centered by passing through the narrowed center cross-section. In this configuration the entry diameter of the wear guide is larger than the central or exit portion and the opening narrows inward either through the center of the wear guide (as shown) or through an exit point of the wear guide (not shown). FIG. 4B shows feed guide 331 or 333 from a side view illustrating this inner hyperbolic or hourglass shaped contouring, with the contouring being symmetric about the center of the wear guide in this embodiment.

In an alternate embodiment, feed guides 331 and 331 could have variable cross sectional profiles, meaning they could have different dimensions (i.e. sizes, diameters, thicknesses, and shapes), at different points along the length of the coils.

In an exemplary embodiment, element 331 (or 333) may be made of coiled metallic wire as shown in FIGS. 4A-4C. Use of coiled wire may advantageously aid in manufacturing of the wear guide and/or minimizing cost. Other wear guides may use alternate configurations, such as cast, forged, or 3D printed metal, ceramic, or plastic structures, and the like.

In the embodiment shown in FIGS. 4A-4C, the coiled metallic wire may be a stainless steel alloy or other metallic material with high wear resistance to allow repeated movement of a push cable therethrough while maintaining a smooth contact surface and minimizing frictional wear. Other advantageous properties in a wear guide material may include corrosion or oxidation/rust resistance which can occur when the push-cable is deployed in salty water or in other chemical contaminant fluids.

As noted above, other embodiments may use different materials such as hard, wear resistant ceramics, plastics, or other similar materials which may be fabricated in various ways as known or developed in the art.

In embodiments such as shown in FIGS. 3A and 3B, the wear guides may be inserted within an opening or other positioning structure in a bracket 310. Bracket 310 may be made from plastic or other materials depending on the application. In an exemplary embodiment, bracket 310 may be an injection molded, vacuum formed, or 3D printed plastic element or elements, and the feed guides 331 and 333 may be molded, screwed, press-fit, or otherwise positioned within the bracket as shown. Through use of injection molding, a plastic bracket 310 may be relatively inexpensive to manufacture and the plastic material may have the same wear resistance and durability as the wear guides, with the wear guides providing all of the push-cable support through deployment or retraction. Use of coiled wire wear guides as shown may also advantageously minimize overall cable guide assembly cost.

Figure 5A:
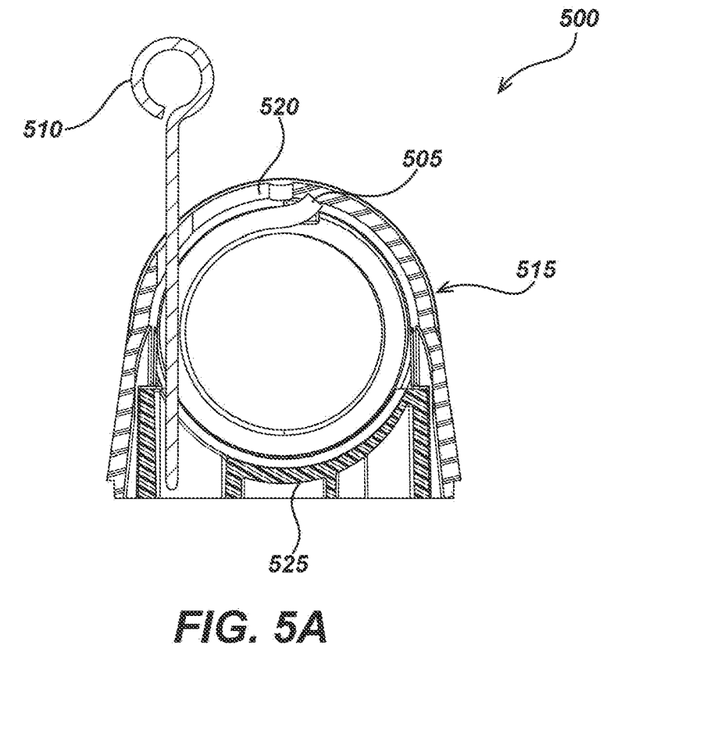
FIG. 5A illustrates details of a coiled wire feed guide embodiment configuration in accordance with aspects of the disclosure.

FIG. 5A illustrates details of an embodiment of a wear guide 500 and catch assembly 510 for use in a push-cable guide assembly including latching assemblies to lock or unlock a push-cable to the wear guide for transport or storage. Catch or latch assembly 510 may be used to restrain the push-cable by positioning it in an engineered gap 520, such as, for example, grasping a coil spring 505 positioned next to a camera head on the distal end of the push-cable (e.g., as the push-cable, spring, and camera head are configured in FIG. 1A, with the added push-cable guide and latch of FIG. 5A providing locking and unlocking of the push-cable such as for storage, transport, etc.).

Cable damage may be prevented by bending the inner, smallest cut off tip of the spring outward so that the sharp cutoff end cannot touch the push-cable jacket. If both cut off ends are placed into alignment and are both locked together and facing to the top, away from the mounting base 525, that by itself may be used to set up the working gap space for a locking wire or lever.

Figure 5B:
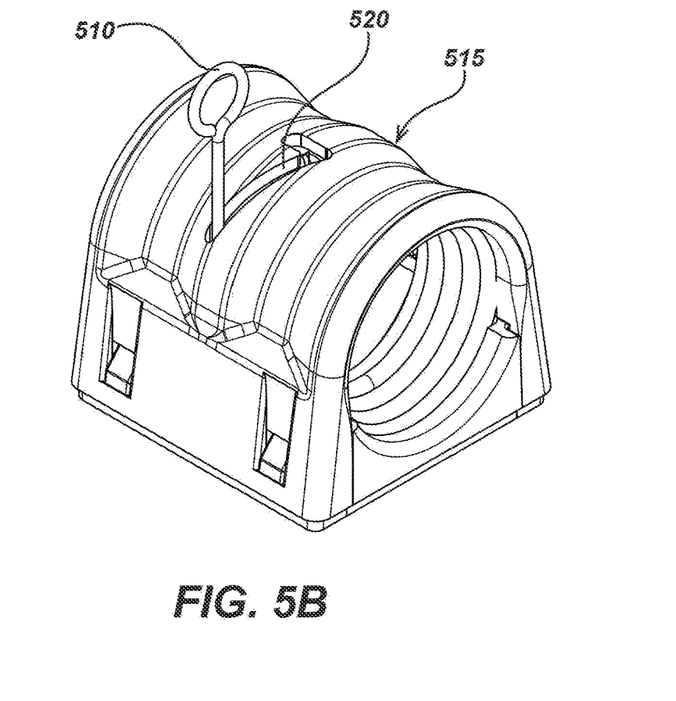
FIG. 5B illustrates details of another coiled wire feed wide embodiment configuration in accordance with aspects of the disclosure.

As shown in FIG. 5B, a spring lock mechanism 510 may be positioned into an engineered gap 520 in embodiment 515.

Figure 5C:
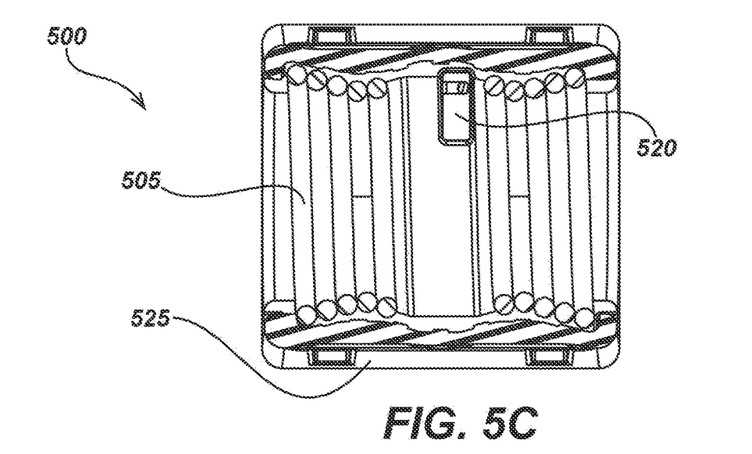
FIG. 5C illustrates a section view of FIG. 5A.

An alternate section view of 5A is shown in 5C.

Figures 5D, 5E:
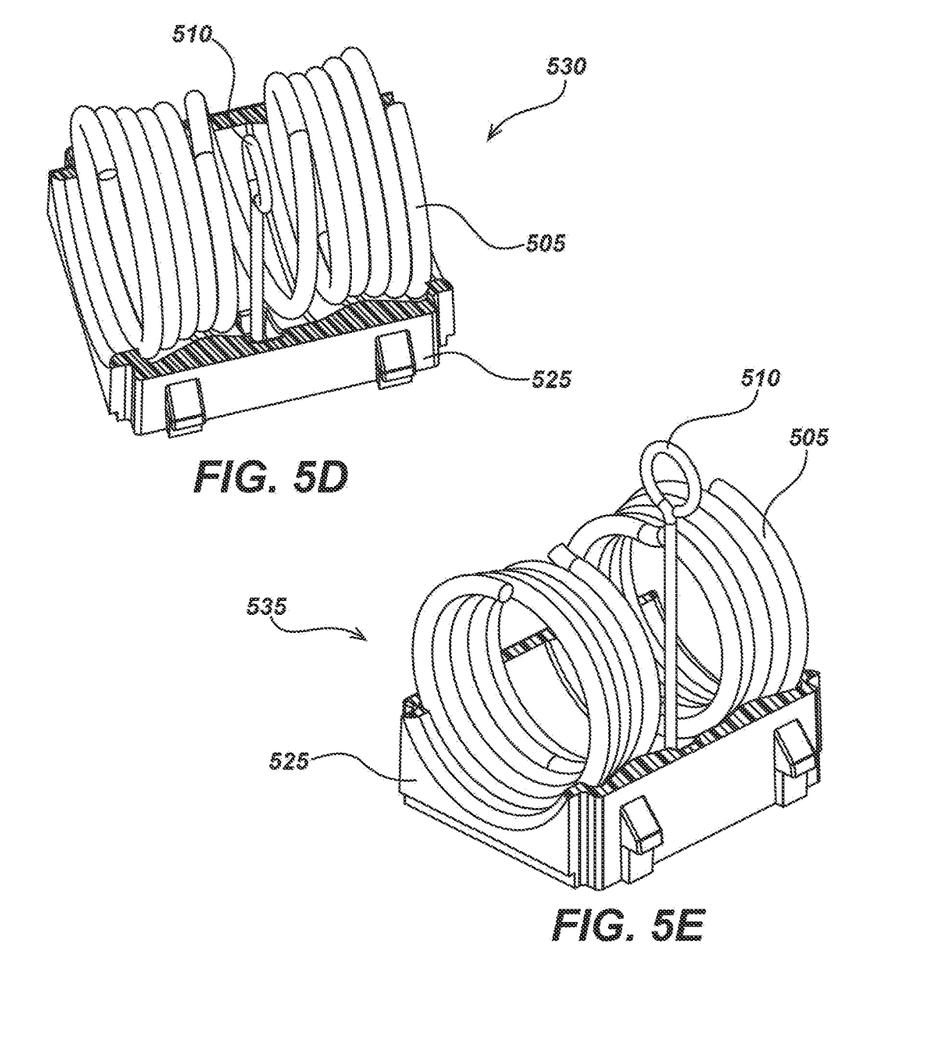
FIG. 5D illustrates details of another coiled wire feed guide embodiment configuration in accordance with aspects of the disclosure.
FIG. 5E illustrates details of another coiled wire feed guide embodiment configuration in accordance with aspects of the disclosure.

Alternate embodiment 530 is shown in FIG. 5D which shows that the full diameter of the inner spring winding 505 may be opened to accommodate the latching mechanism.

Another alternate embodiment 535 is shown in FIG. E which shows spring winding 505 in an alternate configuration.

Figure 6:
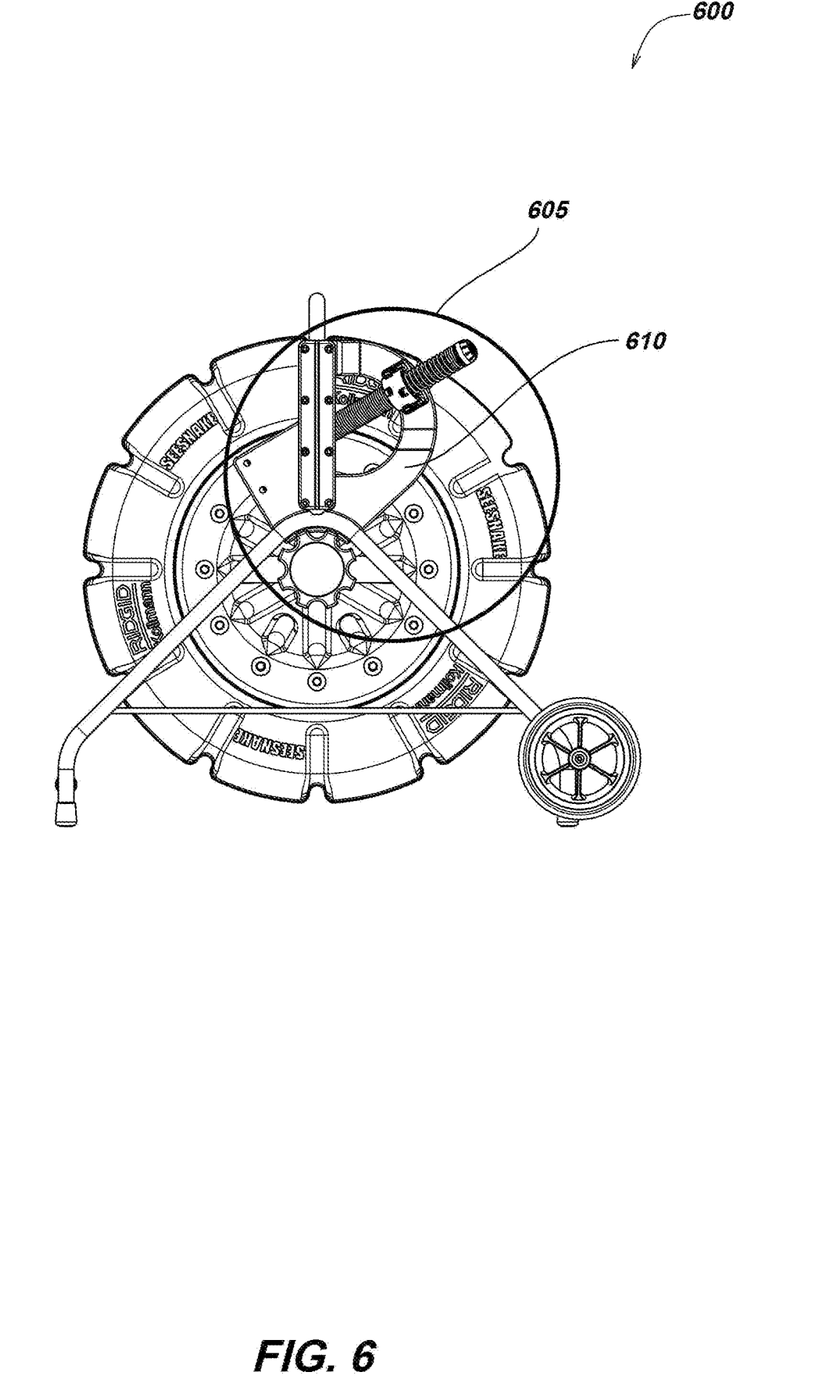
FIG. 6 illustrates details of another embodiment of a video inspection system with a push-cable guide assembly embodiment including a latching mechanism in accordance with aspects of the disclosure.

FIG. 6 illustrates details of another embodiment of a pipe inspection system 600 including a cable guide assembly embodiment 610 as shown within highlighted circle 605. Cable guide assembly embodiment 610 includes a latching mechanism to lock or unlock a push-cable to the guide such as for storage or transportation. Additional details of one embodiment of such a latching mechanism are described subsequently with respect to FIGS. 7A-7C and 8A-8D.

Figure 7A:
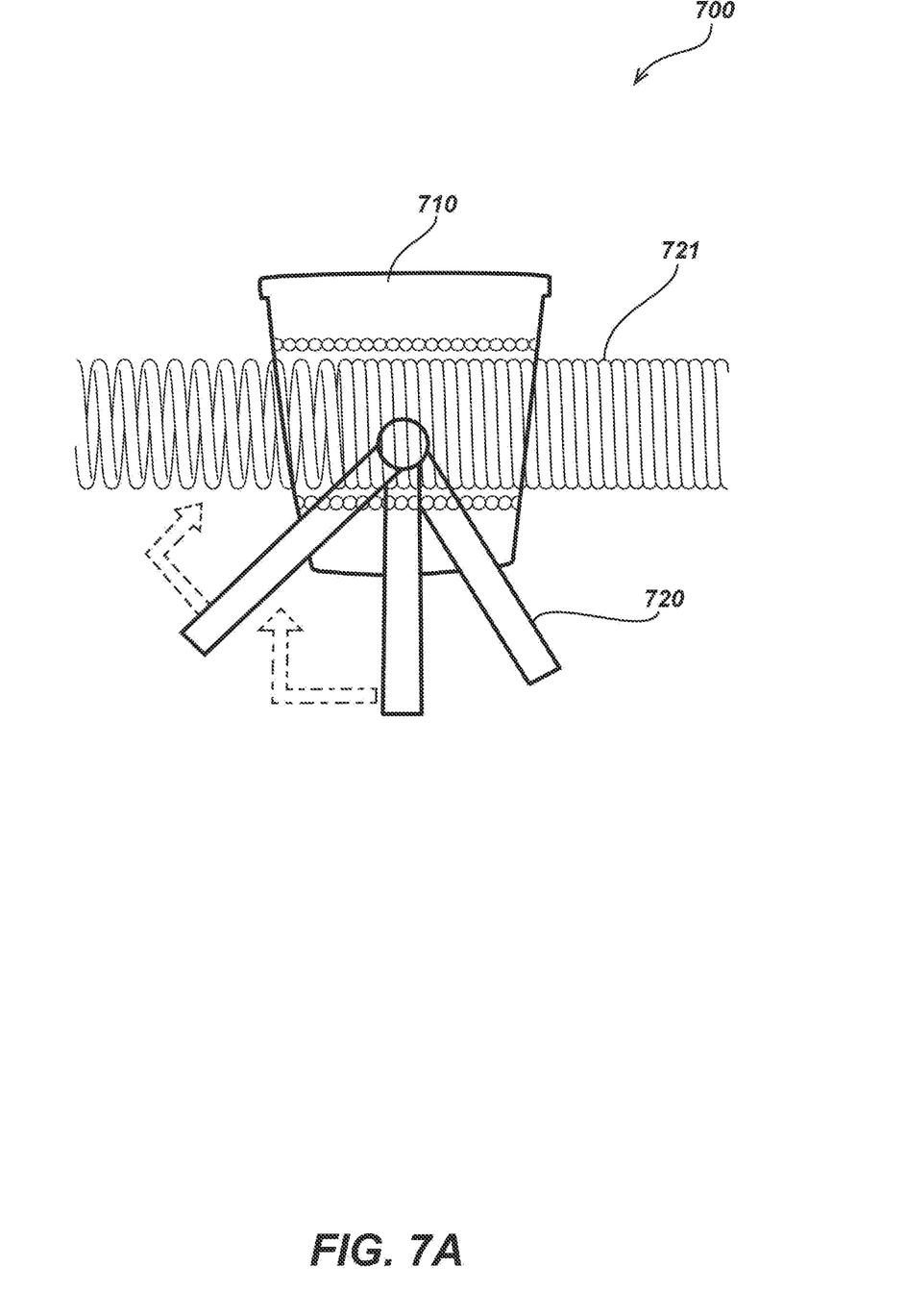
FIG. 7A illustrates details of a latching assembly for use in a push-cable guide assembly such as shown in FIG. 6.
Figure 7B:
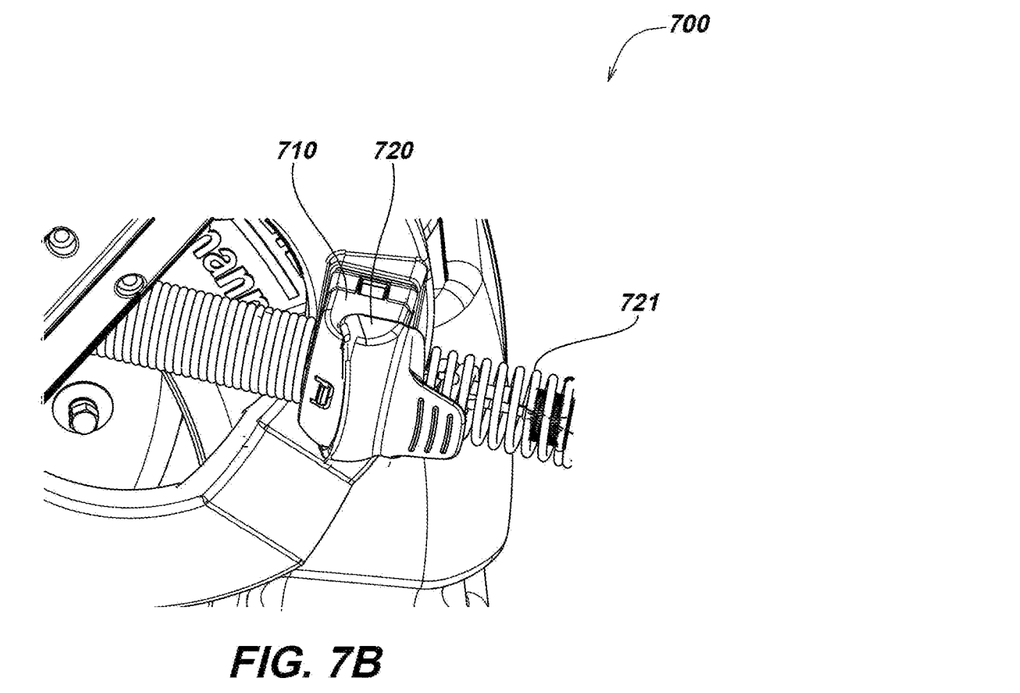
FIGS. 7B-7C illustrate example latching mechanism embodiments and associated push-cables and push-cable springs.
Figure 7C:
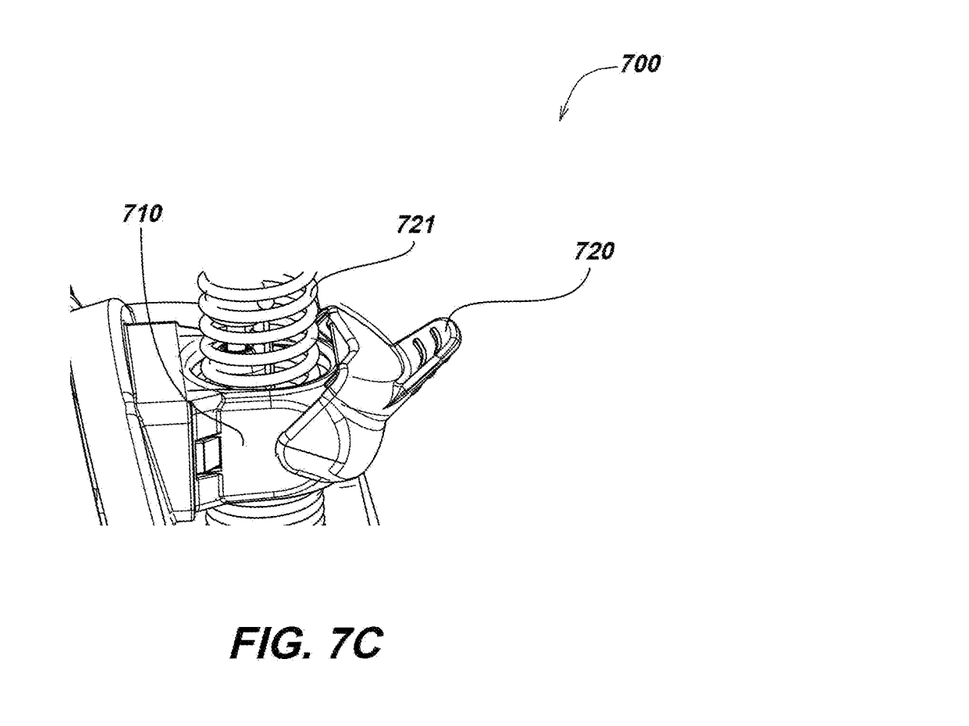

FIG. 7A illustrates details of a latching mechanism embodiment 700 for locking a push-cable spring 721 to a cable guide assembly bracket and feed guide 710 in accordance with aspects of the present disclosure. FIG. 7A illustrates different possible positions for latch assembly 720 (e.g. open or in a closed position on the push-cable spring 721). FIG. 7B illustrates the latch assembly 720 in an closed position, and FIG. 7C illustrates latch assembly 720 in an open position.

Figure 8A:
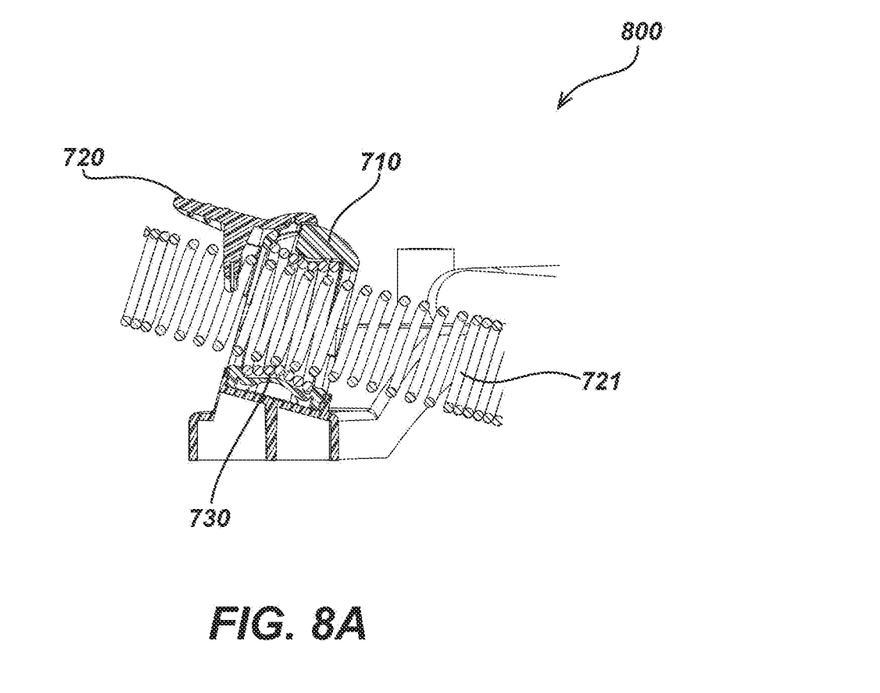
FIGS. 8A-8B illustrate details of a latching assembly on a push-cable guide assembly shown in cross-section in the locked and unlocked position, respectively.
Figure 8B:
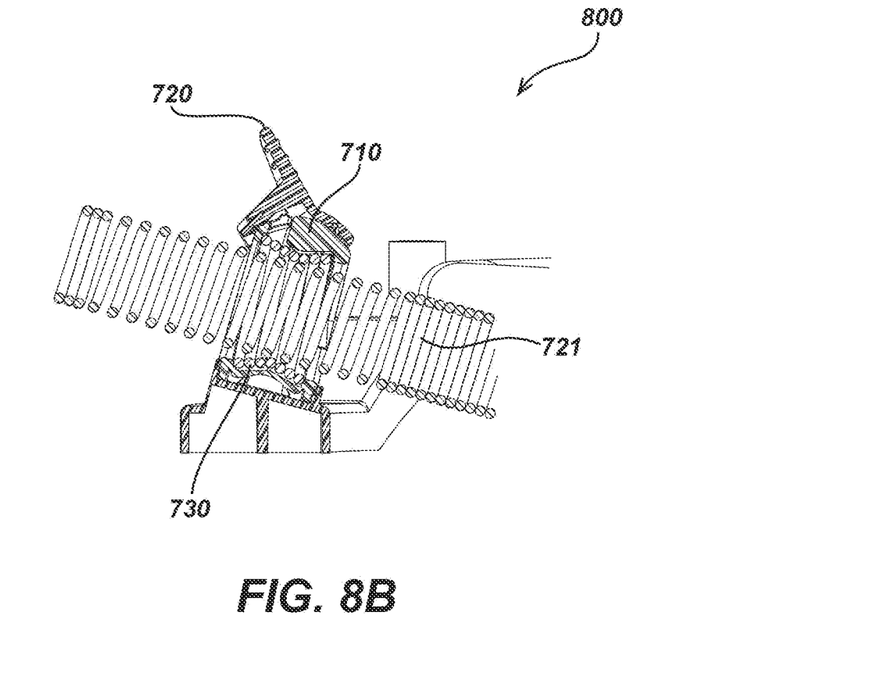
Figure 8C:
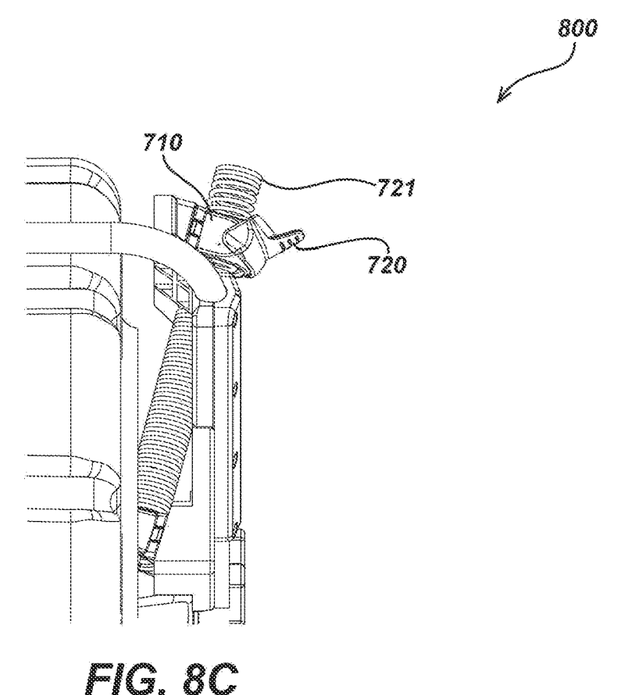
FIGS. 8C-8D illustrate details of a latching assembly on a push-cable guide assembly shown in cross-section in the unlocked and locked position, respectively.
Figure 8D:
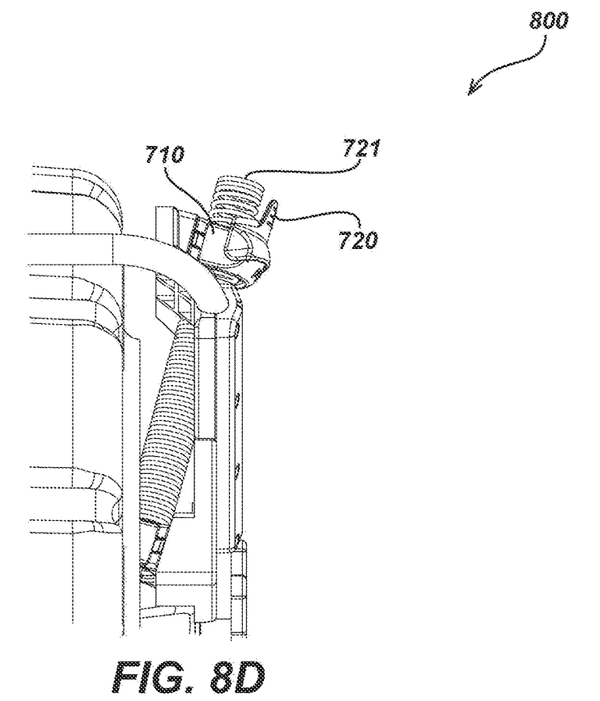

FIGS. 8A through 8C illustrate additional details of latch assembly 720 shown in cross-sectional cutaway views through the push-cable spring including feed guide 730 inside bracket 710.

Other embodiments and modifications of this disclosure may occur readily to those of ordinary skill in the art in view of these teachings.

We claim:

1. A cable guide assembly for use in a video inspection system, comprising:
   a bracket; and
   one or more non-rotating wear guides positioned within openings in the bracket.

2. The assembly of claim 1, wherein the one or more wear guides comprise two spaced-apart wear guides.

3. The assembly of claim 2, wherein the two spaced apart wear guides have an opening defining an inner diameter and are spaced-apart a distance of three or more times the inner diameter.

4. The assembly of claim 1, wherein the wear guides have an hourglass or hyperbolic shaped cross-section.

5. The assembly of claim 1, wherein the wear guides have an inward-tapering cross-section having a larger diameter at an entry side than at an exit side.

6. The assembly of claim 1, further comprising a latching mechanism to lock or unlock a push-cable to one or more of the wear guides.

7. The assembly of claim 1, wherein the wear guide comprises a metal.

8. The assembly of claim 7, wherein the metal is a coiled wire wound with an hourglass or hyperbolic cross sectional shape.

9. The assembly of claim 1, wherein the wear guide comprises a plastic or ceramic material.

10. The assembly of claim 1, wherein the one or more wear guides comprise two wear guides, the two wear guides comprise a wound metal wire having an hourglass or hyperbolic cross-sectional shape, the bracket comprises a plastic material, and further comprising a latching mechanism disposed on the bracket or wear guide to lock the bracket and/or wear guide to a push-cable or push-cable spring.

11. A video pipe inspection system, comprising:
    a push-cable;
    a push-cable reel or drum assembly;
    a camera head operatively coupled to a distal end of the push-cable;
    a push-cable spring positioned at or near the distal end of the push-cable;
    a frame; and
    cable guide assembly attached to the frame, including:
    a bracket; and
    one or more non-rotating wear guides positioned within openings in the bracket.

12. The system of claim 11, wherein the one or more wear guides comprise two wear guides, the two wear guides comprise a wound metal wire having an hourglass or hyperbolic cross-sectional shape, and the bracket comprises a plastic material.

13. The system of claim 12, further comprising a latching mechanism disposed on the bracket or wear guide to lock the bracket and/or wear guide to a push-cable or push-cable spring.

14. The system of claim 11, wherein the one or more wear guides comprise two spaced-apart wear guides.

15. The system of claim 12, wherein the two spaced apart wear guides have an opening defining an inner diameter and are spaced-apart a distance of three or more times the inner diameter.

16. The system of claim 11, wherein the wear guides have an inward-tapering cross-section having a larger diameter at an entry side than at an exit side.

17. The system of claim 11, further comprising a latching mechanism to lock or unlock a push-cable to one or more of the wear guides.

18. The system of claim 11, wherein the wear guide comprises a metal.

19. The system of claim 11, wherein the wear guide comprises a plastic or ceramic material.

20. The system of claim 11, wherein the wear guides have an hourglass or hyperbolic shaped cross-section.

\* \* \* \* \*